Feb. 15, 1927.

F. P. CHURCH

ELECTRIC METER CIRCUIT

Filed March 26, 1923

1,618,058

Inventor:
Frederick P. Church,
by *Alexander F. Smith*
His Attorney.

Patented Feb. 15, 1927.

1,618,058

UNITED STATES PATENT OFFICE.

FREDERICK P. CHURCH, OF LYNN, MASSACHUSETTS, ASSIGNOR TO GENERAL ELECTRIC COMPANY, A CORPORATION OF NEW YORK.

ELECTRIC-METER CIRCUIT.

Application filed March 26, 1923. Serial No. 627,934.

My invention relates to intergrating type meters and more in particular to a novel circuit connection and method of adjusting for light load compensation for such meters.

In this type of meter, where the light load compensation is made by supplying to an energizing circuit of the meter a small additional current in an amount sufficient to furnish a torque for overcoming the friction of the meter itself, it has generally been customary to supply the light load compensating current from a potential circuit in which there is included a very high resistance and to adjust the compensating current by adjusting the value of this high resistance. This high resistance usually consists of a combination porcelain and carbon rod, the variation in resistance being made by moving a metal contact over the surface. This has the objection that the difference in coefficient of expansion between the high resistance rod and the metal contact creates a different surface pressure and, therefore, a different contact resistance. It is also very hard to adjust, as a very slight change in the pressure of the contact makes a large change in the resistance.

It is the object of my invention to provide a light load compensating circuit which is easily and accurately adjustable and which, when adjusted, will remain permanently in this condition. In carrying my invention into effect, I do not attempt to vary the high resistance unit through which the light load compensating current flows, but instead make the high resistance unit permanent and of a resistance value less than usual and then shunt a portion of the current derived from the potential circuit around the energizing circuit of the meter allowing only the correct amount for compensation to effect the meter.

Where the meter to be compensated is used in connection with a line shunt, I utilize the line shunt as the return path of the excess compensating current and a low resistance in one of the meter shunt leads as a means for obtaining an easy and accurate adjustment of the compensating current which effects the meter.

Preferably the point of contact between the high resistance, which limits the light load compensating current, and the low resistance shunt lead is made adjustable by a special form of rheostat which permits very fine adjustments to be easily and accurately made without changing the resistance of the shunt lead itself.

Figure 1:
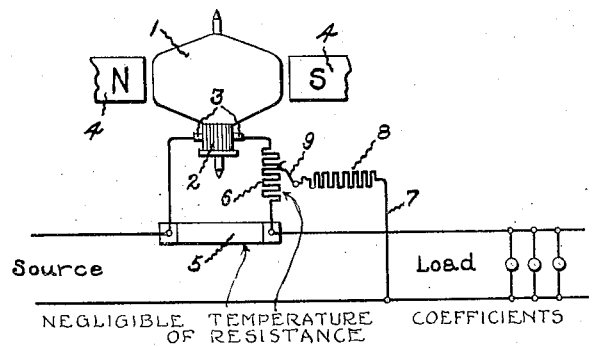
Figure 2:
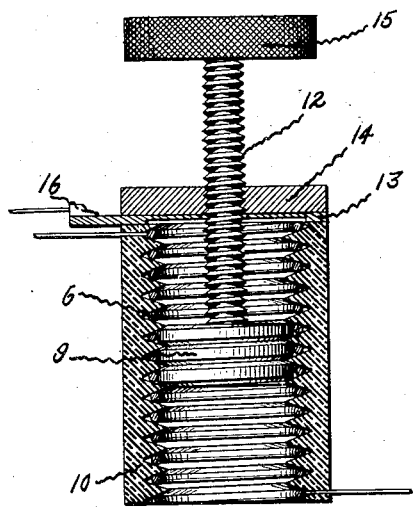
Figure 3:
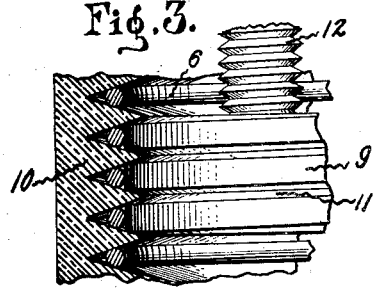

The features of my invention which I believe to be novel and patentable will be pointed out in the claims appended hereto. A specific application of my invention will now be described as applied to a direct current ampere hour meter, the circuit connections of which are shown in Fig. 1 of the accompanying drawings. Fig. 2 shows a cross section through the special rheostat which forms the low resistance shunt lead and adjustable contact and Fig. 3 shows a detail of the rheostat.

Referring to Fig. 1 of the drawings, 1 indicates the rotating armature of a direct current ampere hour meter. It is illustrated as of the type having a commutator 2 and brushes 3 through which the current to be measured, or a definite portion thereof, is caused to flow. In this instance the field is shown represented as being produced by stationary permanent magnets 4. The armature 1 is connected across the terminals of a line shunt 5 and the shunt lead on the load side of the shunt contains a low resistance 6. The armature circuit is made of copper and has a resistance value substantially equal to the resistance 6 which is made of a material having a negligible temperature coefficient such as manganin. The line shunt 5 is also made of a material having a negligible temperature coefficient and its resistance is very small as compared to the resistance of the armature circuit so that only a small portion of the line current will flow through the meter. It should be noted that the resistor 6 forms, in connection with the circuit described, a common expedient for compensating the meter for temperature changes. By placing this resistor on the load side of the meter it can also be utilized as a means for adjusting for light load compensation in a manner now to be described.

In order that the speed of rotation of the ampere hour meter will be directly proportional to the load current flowing in the line it is necessary to produce in the meter a torque just sufficient to overcome the friction of the meter itself. This is accomplished by supplying to the armature circuit a very small constant current which is derived from a potential circuit 7 connected across the line. The light load compensating current is limited by a high permanent resistance 8. For a 110 volt circuit the resistance value of 8 is generally in the neighborhood of 10,000 to 15,000 ohms. As shown in Fig. 1 the resistance 8 is connected from the opposite side of the line to an adjustable point on the resistance shunt lead so that the current which flows through resistance 8 may divide and return to the source of supply through the armature of meter 1 and through the line shut 5 in parallel.

The proportion of this current which flows through the meter will depend upon the point of contact which the adjustable contact 9 makes with resistance 6. Since the resistance 6 is approximately equal to the resistance of armature 1 and considerably higher than the resistance of shunt 5 it will be evident that a very wide and accurate adjustment of the amount of this current which flows through the meter can be made. This adjustment does not in any way affect the division of the load current between the meter circuit and the line shunt 5 because the resistance of the shunt lead 6 is not changed and the proportion of the current derived from the potential current which flows through the line shunt is too small to affect the potential drop across the shunt produced by the load current.

With my improved circuit connection, the high limiting resistance 8 need only have a resistance value which is less than half what would be required for the usual compensating circuit. The resistor 8 may therefore be made less bulky than usual and a wider choice of the available resistance materials having suitable characteristics may be had.

After the light load compensating adjustment has been made, the contact joint 9 may, if desired, be permanently soldered to the resistance 6. However, in order to make the point of contact between contact 9 and resistance 6 easily and accurately adjustable at all times and at the same time obtain a firm contact which will remain in the position to which it has been adjusted, I prefer to make the resistance 6 and the contact 9 in the form of the rheostat shown in Fig. 2. Here the resistance 6 is in the form of a wire laid into the threaded depressions of an internally threaded cylinder 10 made of any suitable insulating material such as bakelite. The extremities of the resistance wire 6 are respectively provided with leads suitable for connecting to the commutator brush 3 of the meter and to the line shunt 5. The adjustable contact 9 is in the form of a short metal cylinder provided with screw threads 11 adapted to cooperate with the inwardly projecting threads in the cylinder 10 in such a manner that a good electrical and mechanical contact is provided between the resistance wire 6 and the cylinder. These details are shown more clearly in Fig. 3.

The cylinder 9 is secured to an axial threaded rod 12 which extends out of the cylinder through a concentric washer 13 and a check nut 14 where it terminates in a knurled head 15. These parts are made of conducting material such as copper or brass. A suitable terminal 16 is secured to the washer 13 in order that the same may be electrically connected to the resistance 8.

It will now be evident that when the terminals of the rheostat are connected up as shown in Fig. 1 that the light load compensation of the meter may be accurately and readily adjusted by turning the knurled head 15 so as to screw the cylindrical contact 9 up or down in the cylinder 10, and that when the adjustment is made, the contact 9 may be secured in place by screwing the check nut 14 down so as to clamp the washer 13 against the end of the cylinder 10. The current derived from the potential circuit will then flow through resistance 8, lead 16, washer 13, check nut 14, rod 12, contact 9 to the contacting surface of resistance wire 6 where it will divide, the correct amount for compensating the meter flowing through the meter armature and the remaining part through the line shunt. The rheostat will preferably be permanently mounted in the instrument case with the adjusting means accessible.

While I have described my invention as applied in a particular way to a particular type of ampere hour meter, I do not wish to be limited thereto as it will be evident that the broad principle of my invention is applicable to other types of integrating meters such, for example, as watthour meters whether used with a line shunt or not.

What I claim as new and desire to secure by Letters Patent of the United States, is,—

1. In combination an electric line, an integrating type meter associated therewith, a potential circuit associated with said meter and line for supplying light load compensating current to said meter, a high resistance in said potential circuit for limiting the light load current and means for permitting only a portion of the current derived from said potential circuit to affect said meter.

2. In combination an electric line, an integrating type meter connected to said line, a potential circuit associated with said line and meter for supplying light load compensating current to said meter, a permanent resistance in said circuit for limiting said current, means for shunting a portion of the current derived from said potential circuit around said meter and means for adjusting the proportion of the current thus shunted.

3. In combination an electric transmission line, a current shunt in said line, an integrating meter having an energizing circuit connected across said shunt, a resistance in the shunt lead on the load side of said meter, and a potential circuit connected between the opposite side of the line and a point on said resistance for supplying the light load compensating current to the said energizing circuit of the said meter.

4. In combination an electric transmission line, a current shunt in said line, an integrating meter having its armature circuit connected across said shunt, a resistance comparable to the armature resistance of said meter in the shunt lead on the load side of said meter, said line shunt being of considerable lower resistance than that of the circuit in shunt thereto, and a potential circuit connecting between the opposite side of the line and a point on said shunt lead resistance for furnishing the light load compensating current to said meter.

5. In combination an electric transmission line, a load supplied thereby, a current shunt in said line, an integrating meter having an energizing circuit connected across said shunt, a permanent resistance in the shunt lead on the load side of said meter, a potential circuit containing a high permanent resistance connected between the opposite side of said line and an adjustable point on said first mentioned resistance for supplying the light load compensating current for said meter.

6. In an electrical, integrating type metering device, a constant resistance element in an energizing circuit of said meter utilized for temperature compensation, and a potential circuit for supplying light load compensating current to said meter connected to an adjustable point on said resistance, said resistance element being so positioned with respect to the meter and potential circuits that the light load compensating current may be adjusted by adjusting said point of contact.

In witness whereof, I have hereunto set my hand this 22nd day of March, 1923.

FREDERICK P. CHURCH.